Nov. 17, 1970  J. E. GOLDMACHER ET AL  3,540,796
ELECTRO-OPTICAL COMPOSITIONS AND DEVICES
Filed March 31, 1967
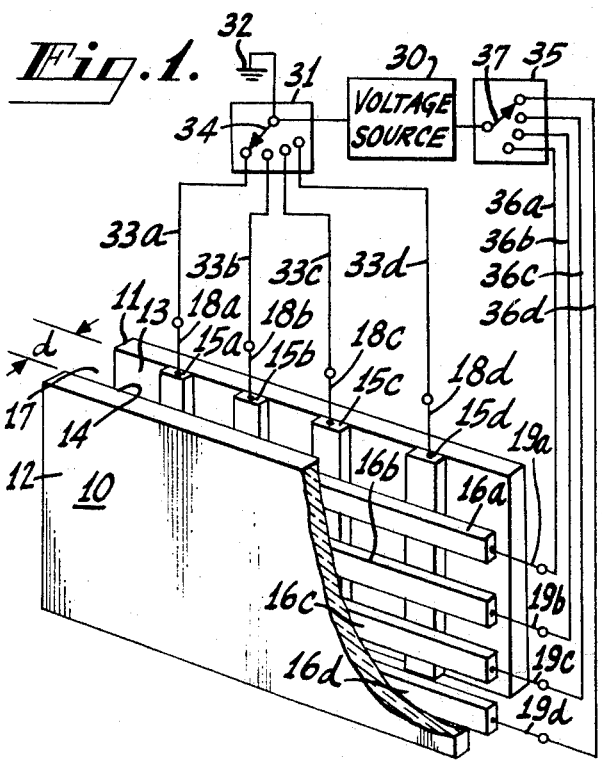
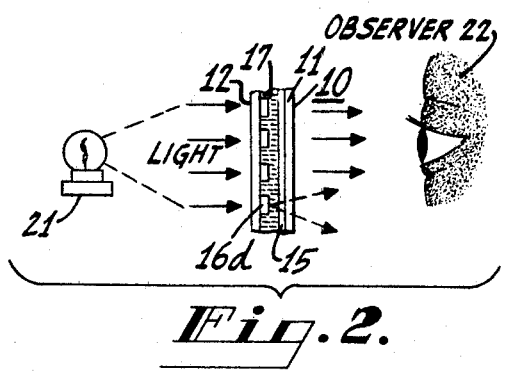
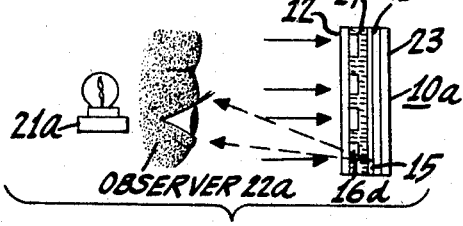
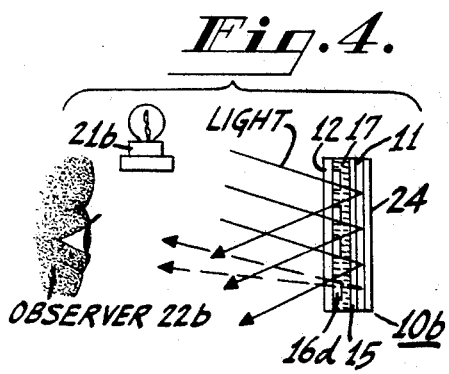
INVENTORS
JOEL E. GOLDMACHER &
JOSEPH A. CASTELLANO
BY Glenn H. Bruestle
ATTORNEY United States Patent Office 3,540,796
Patented Nov. 17, 1970

3,540,796
ELECTRO-OPTICAL COMPOSITIONS AND DEVICES
Joel E. Goldmacher, Princeton, and Joseph A. Castellano, North Brunswick, N.J., assignors to RCA Corporation, a corporation of Delaware
Continuation-in-part of application Ser. No. 556,321, June 9, 1966. This application Mar. 31, 1967, Ser. No. 627,451
Int. Cl. G02f 1/28
U.S. Cl. 350—160
9 Claims

ABSTRACT OF THE DISCLOSURE

A novel class of nematic liquid crystal compositions and a novel display device employing the compositions wherein the compositions include a compound represented by the general formula

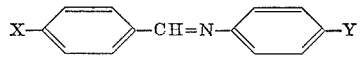

wherein X and Y are either alkoxy radicals or acyloxy radicals such that when X is an alkoxy radical Y is an acyloxy radical and vice versa. The novel display device consists of a film of a novel liquid crystal composition held between two supports plates, and parallel electrode strips on each of the support plates. The longitudinal axes of the parallel strips on one support plate is orthogonal to the longitudinal axes of the parallel strips on the second support plate. The electrodes are in contact with the film. The device includes means for applying an electric field to the film so as to cause turbulence of the liquid crystal composition in the region of the applied field.

CROSS REFERENCES TO RELATED APPLICATIONS

This is a continuation-in-part of application Ser. No. 556,321 filed June 9, 1966.

BACKGROUND OF THE INVENTION

This invention relates to improved nematic liquid crystal compositions and improved display devices including these novel compositions.

Mesophase relates to a state of matter intermediate between the crystalline solid and the isotropic liquid. A common name for this state is "liquid crystal." The term nematic refers to a specific type of liquid crystal.

Compositions having a mesomorphic state or mesophase have two "melting" points. The first melting point is at the transition temperature of the crystalline solid state and the mesomorphic state, the second melting point is at the transition temperature of the mesomorphic state and the isotropic liquid. Between these temperatures the compound exists in the mesomorphic or liquid crystalline state in which it behaves both as a liquid, in that it flows and exists in drops that coalesce, and as a solid in that it is optically or electrically anisotropic and has a structural order in one or two dimensions.

Nematic liquid crystals are generally electrically and magnetically anisotropic. On surfaces such as glass, prior art nematic liquid crystals in their nematic phase generally adopt a characteristic threaded texture, visible between crossed polaroids. This texture is thought to consist of many domains or clusters in which the liquid crystal molecules have a fixed orientation. According to the cluster theory of nematic liquid crystals, the clusters are normally randomly oriented accounting for the light-scattering properties and for the turbid appearance of a fairly large volume. Each cluster is birefringent and is about $10^{-5}$ cm. in size. Upon applying an electric or magnetic field to a layer of these prior art mesomorphic crystals, the clusters tend to become oriented in a particular direction thereby changing the light-scattering and birefringent properties of the layer. The degree of orientation is dependent upon the magnitude of the applied field. Hence, light-scattering properties and birefringent properties of a volume of nematic liquid crystalline material can be modulated with an electric or magnetic field. These properties are useful in electro-optical devices, such as in Kerr effect devices, in devices wherein the plane of polarization of a light beam is rotated and in optical display devices wherein the degree of scattering of a transmitted or deflected light beam is modulated. Display devices using the effect of rotation in an electric field have contrast ratios of only 2:1 to 3:1 which is not adequate for most display purposes.

In addition the use of a liquid crystal composition in a display device is limited to temperatures in which the composition is in the mesomorphic state, that is, the composition must be above the crystal-mesomorphic transition temperature. Nematic liquid crystal compositions known in the art have the disadvantage of possessing a crystal-mesomorphic transition temperature substantially above room temperature. Therefore, heating means must be provided to keep the composition in the mesomorphic state. The higher this transition temperature, the greater the power required for heating. Another disadvantage of prior-art compositions is that the temperature range in which the composition remains in the liquid crystalline state is relatively small. This may result in a need for a means to control the temperature.

Still another disadvantage is the tendency of prior-art nematic liquid crystal molecules to align themselves into domains on a surface such as glass. This alignment results in an unwanted reflection and scattering of light incident on the device with no applied field. This zero field scattering limits the maximum attainable contrast ratio between an area having a field applied across the liquid crystal layer and an adjacent area without a field.

Still another disadvantage found in many prior-art liquid crystal compositions is the slow speed of rotation of the molecules upon the application of or removal of an electric field which limits the usable switching speeds in optical devices.

It is an object of this invention to provide an improved electro-optical device.

Still another object is to provide a novel family of nematic liquid crystal compositions useful in electro-optical devices.

SUMMARY OF THE INVENTION

The novel family of nematic liquid crystal compositions is represented by the formula

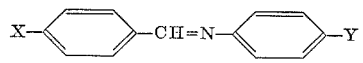

wherein, X and Y are radicals chosen from the group consisting of saturated alkoxy radicals having from 1 to 9 carbon atoms and saturated acyloxy radicals having from 2 to 5 carbon atoms such that, when X is a saturated alkoxy radical, Y is a saturated acyloxy radical and vice versa. The saturated alkoxy radical has at least 3 carbon atoms when the saturated acyloxy radical has only two carbon atoms. The composition may include up to 60 weight percent of p-(anisalamino)-phenylacetate, based on the total weight of said composition. An acyloxy radical is a radical of an aliphatic ester having the general formula

In the novel compositions the oxygen bonded to the carbon atom of the radical with a single bond is also bonded to an aromatic ring, for example, in

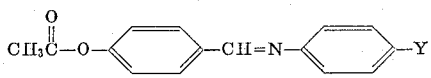

The improved electro-optical device includes a layer of a composition of the type described above, means for containing said layer when said composition is in its nematic liquid crystalline state, and means for applying an electric field to said layer, said field producing an electric current flow in said layer and being of sufficient magnitude to cause non-destructive turbulent motion in said layer in the region of the electric field.

One of the features characterizing the novel electro-optical devices employing the novel family of compositions is the relatively low minimum operating temperature due to the low crystal-mesomorphic transition temperatures of members included in the family of compositions. Mixtures have been found which have a crystal-mesomorphic transition temperature below room temperature. Another feature is the wide temperature range in which the novel devices can be used. One example, included in the novel family of compositions, is the compound having the formula

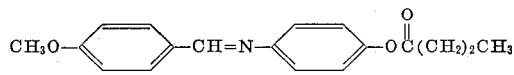

which has a crystal-mesomorphic transition temperature of about 50° C. and a mesomorphic-isotropic liquid transition temperature of 113° C. Another example included in the novel family of compositions is an equal weight mixture of p-(anisalamino)-phenylacetate

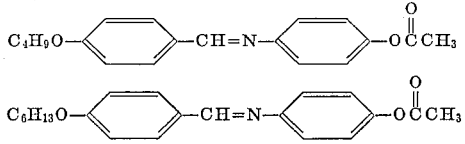

and

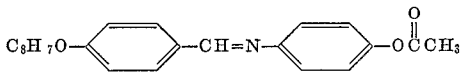

This mixture has a mesomorphic state from 39° C. to 104° C. Examples of known nematic crystals are p-(azoxy-anisole) and p-anisalamino)-phenylacetate. These compounds have mesophase ranges from 117° C. to 136° C. and from 81° C. to 110° C., respectively. Members of the novel family of compositions shown above have substantially lower crystal mesomorphic transition temperatures and wider mesophase ranges than the prior-art nematic liquid crystals. Mixtures, such as the novel mixture described above may be prepared so as to possess a lower crystal-mesomorphic transition temperature than any of the constituents comprising the mixture. The mesomorphic-isotrophic liquid transition temperature of the constituents comprising such a mixture is not substantially lowered. This results in a device operable not only at a lower temperature, but also over a wider temperature range than devices including the individual constituents of such a mixture.

Another feature of the novel device is that it can produce brighter and higher contrast images than previous similar liquid crystal display devices. This is due to the different mode of operation of these devices as compared to prior art liquid crystal devices. The novel devices exhibit their optical effect of light scattering due to a non-destructive turbulence produced in the region of an applied electric field which field is accompanied by an electrical current flow in the liquid crystal layer. It is also due to the lack of a tendency of molecules included in the novel composition to align themselves on a surface such as glass when no field is applied.

Still another advantage is the faster switching rates at which the novel device may be operated due to the shorter response times of the novel nematic liquid crystal compositions to an applied field. Speeds necessary for television transmission are attainable.

BRIEF DESCRIPTION OF THE DRAWINGS

The invention is described below in greater detail in connection with the accompanying drawings in which:

FIG. 1 is a perspective, partially cut-away view of an electro-optical display device embodying the invention, and a schematic representation of a circuit for operating the device;

FIG. 2 is an elevational view of the transmissive mode of operation of the device shown in FIG. 1;

FIG. 3 is an elevational view of the absorptive mode of operation of the device shown in FIG. 1, and FIG. 4 is an elevational view of the reflective mode of operation of the device shown in FIG. 1.

DESCRIPTION OF THE PREFERRED EMBODIMENTS

FIG. 1 illustrates an example of a novel crossed grid optical display device 10. The novel device 10 consists of back and front transparent glass support plates 11 and 12 respectively. The two plates 11 and 12 are parallel, and are separated by a distance $d$ which is less than about ½ millimeter, preferably from 5 to 15 microns. On the inner face 13 of the back plate 11 is an array of parallel spaced transparent conductive back electrode strips 15a, 15b, 15c and 15d. In this example, only four such back strips (15a, 15b, 15c and 15d) are shown, but, a much larger number of electrode strips may be used. On the inner surface 14 of the front plate 12, is an array of parallel, spaced transparent conductive front electrode strips 16a, 16b, 16c and 16d, said front strips being substantially perpendicular to the direction of the conductive back strips on the back plate 11. Again, only four such front strips (16a, 16b, 16c and 16d) are shown but a much larger number may be used.

The space, $d$, between the back and front plates 11 and 12 is filled with a novel nematic liquid crystal composition as a layer 17 as disclosed herein. For example:

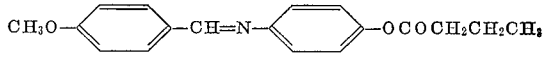

This device includes connecting means 18a to 18d and 19a to 19d for applying a voltage to the conductive back electrodes 15a to 15d and to the conductive front electrodes 16a to 16d, respectively. As used herein, said connecting means and said conductive strips are the means for applying the electric field to the liquid crystal layer. In DC operation, the electrodes must be in contact with the liquid crystal layer so that an electric current can flow.

FIG. 1 also includes a circuit diagram including a back strip commutator switch 31 having its common contact 34 connected to one side of a voltage source 30, and to ground 32. A plurality of the commutator contacts of the switch 31 are connected to each of the back strip connecting means 18a to 18d through leads 33a to 33d. Also, a front strip commutator switch 35 is provided which has a plurality of commutator contacts connected to the front strip connecting means 19a to 19d through leads 36a to 36d and a common contact 37 connected to the other side of the voltage source 30.

In operation, (see FIGURE 2) a light source 21 is positioned on one side of the device 10 so that light is directed through the device in a direction substantially normal to the major faces of the plates 11 and 12. The nematic liquid crystal compositions disclosed herein may be utilized as the light-scattering medium in an Eidophor projection television system or other display devices operating on the principal of light scattering. The novel nematic liquid crystals disclosed herein are also useful as solvents for nuclear magnetic resonance spectroscopy.

The electro-optical devices described herein include an active electro-optical medium comprised of a novel nematic liquid crystal composition consisting essentially of at least one compound represented by the formula

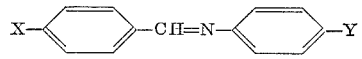

wherein: X and Y are radicals chosen from the group consisting of saturated alkoxy radicals and saturated acyloxy radicals, such that when X is a saturated alkoxy radical, Y is a saturated acyloxy radical and vice versa. The saturated acyloxy radical has from 2 to 5 carbon atoms and the saturated alkoxy radical has from 1 to 9 carbon atoms. When the saturated acyloxy radical has only two carbon atoms, then the saturated alkoxy radical has at least 3 carbon atoms. The composition may include up to 60 weight percent of p-(anisalamino)-phenylacetate based on the total weight of the composition.

In order for the novel compounds to produce best results in the novel devices they are preferably first purified so as to remove particulate impurities as well as impurities within the crystal structure. One measure of the purity is the resistivity of the compounds. The pure compounds as prepared herein generally have resistivities in the range of about $10^9$–$10^{10}$ ohm-centimeters. Resistivity measurements were performed using a cell 1 cm. by 1 cm. containing about a ¼ mil thick layer of liquid crystal composition and applying a voltage of about 15 volts.

Examples of compounds included in the novel nematic liquid crystal composition are given in Table I along with their transition points as measured after repeated recrystallization of the raw material to a point of constant and reversible nematic-isotropic liquid transition.

Table II gives examples of mixtures included in the novel compositions.

The numbers representing the components given in Table II refer to the numbers designating the novel compounds in Table I except that 11 is a known compound, namely p-(anisalamino)-phenylacetate. This compound which is represented by the formula

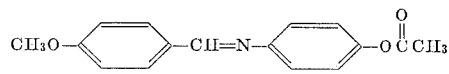

has a crystal-mesomorphic transition temperature of 81° C. and a mesomorphic-isotropic liquid transition temperature of 110° C.

Percent designation refers to weight percent based on the total weight of material in the composition.

TABLE II.—MIXTURES INCLUDED IN THE NOVEL LIQUID CRYSTAL COMPOSITIONS

| Mixture Example | Components | Crystal-mesomorphic transition temp., °C. | Mesomorphic-isotropic liquid transition temp., °C. |
|---|---|---|---|
| A | 50% 11, 50% 4 | 47 | 108 |
| B | 35.1% 11, 32.6% 4, 33.2% 7 | 40 | 103 |
| C | 25.5% 11, 24.5% 4, 50% 7 | 45 | 103 |
| D | 25% each of 11, 4, 6 and 7 | 39 | 104 |
| E | 50.1% 3, 49.9% 2 | 48 | 118 |
| F | 34.8% 3, 34.6% 2, 30.6% 1 | 53 | 117 |
| G | ⅓ wt. ratio each of 9, 4 and 11 | 22 | 105 |
| H | ⅓ wt. ratio each of 9, 10, 11 | 25 | 105 |
| I | 50% 9, 50% 10 | 45 | 106 |

The novel compositions represented by the mixtures have the dual advantage of a low crystal-mesophase transition temperature and a wide temperature range in which the mesophase is stable. The examples given in Table II have a mesophase range of about 60 to 80 degrees. This wide range makes expensive and bulky temperature control means unnecessary.

TABLE I

[Compounds included in the novel liquid crystal compositions $$X-\langle\bigcirc\rangle-CH=N-\langle\bigcirc\rangle-Y]$$

| Compound Example | X | Y | Crystal-mesomorphic transition temp., °C. | Mesomorphic-isotropic liq. transition temp., °C. |
|---|---|---|---|---|
| 1 | $CH_3CH_2\overset{O}{\overset{\|}{C}}$ | $-OCH_3$ | 86 | 118 |
| 2 | $CH_3(CH_2)_2\overset{O}{\overset{\|}{C}}O-$ | $-OCH_3$ | 86 | 119 |
| 3 | $CH_3(CH_2)_2\overset{O}{\overset{\|}{C}}O-$ | $-OC_6H_{13}$ | 86 | 120 |
| 4 | $C_4H_9O-$ | $-O\overset{O}{\overset{\|}{C}}CH_3$ | 82 | 113 |
| 5 | iso $C_5H_{11}O-$ | $-O\overset{O}{\overset{\|}{C}}CH_3$ | 74 | 82 |
| 6 | $C_6H_{13}O-$ | $-O\overset{O}{\overset{\|}{C}}CH_3$ | 88 | 109 |
| 7 | $C_8H_{17}O-$ | $-O\overset{O}{\overset{\|}{C}}CH_3$ | 80 | 105.5 |
| 8 | $C_9H_{19}O-$ | $-O\overset{O}{\overset{\|}{C}}CH_3$ | 86 | 100 |
| 9 | $CH_3O-$ | $-O\overset{O}{\overset{\|}{C}}(CH_2)_2CH_3$ | 49–50 | 113 |
| 10 | $CH_3O$ | $-O\overset{O}{\overset{\|}{C}}(CH_2)_2CH_3$ | 55 | 100 | observer 22 is on the opposite side of the device 10 from the light source 21. For zero applied field, the liquid crystal layer is not in turbulent motion and the observer 22 sees the entire plate area as uniformly bright. When a voltage, such as from a voltage source 30, of sufficient magnitude is applied between a back electrode strip of the group 15a, 15b, 15c, and 15d, and a front electrode strip of the group 16a, 16b, 16c, and 16d, via the connecting means 18a to 18d and 19a to 19d respectively, the liquid crystal molecules in the regions adjacent the intersection of the energized electrode strips go into non-destructive turbulent motion which causes variations in refractive index in that region. This results in scattering of the light incident on that region, and the observer will see this region of his field of view become darker than the remaining plate. For example, if the two electrode strips energized are 15a and 16d, the region of the layer 17 which will darken is the region where the back electrode strip 15a is opposite the front electrode strip 16d. This is referred to as the region of intersection of these strips. The region of the layer 17 adjacent the remainder of the back and front strips 15a and 16d which has only half the voltage across it as compared to the region of intersection of the strips will be unaffected if the voltage is below the threshold required to cause turbulence of the liquid crystals. This threshold depends on the liquid crystal composition and the electrode material but is generally in the region of about $10^4$ volts per centimeter of layer thickness.

By energizing more than one electrode strip from each set, a plurality of predetermined areas are thus darkened. Scanning techniques known to the art may be utilized to sequentially and cyclicly energize the conductive strips.

Row selector circuits and column selector circuits for energizing selected rows and columns of a cross-grid are known; for example, in the mural television art, and need not be described in detail here. See, for example, U.S. 2,982,894, issued Mar. 15, 1960 to J. A. Rajchman. In this manner various types of information may be optically displayed, for example, a pattern of alpha-numerical characters. Furthermore, by having a large number of closely-spaced electrode strips on each substrate; for example, electrode strips that are on the order of 1 mil wide and spaced ½ mil apart, a picture can be displayed on a device of this type. Also, the percent light transmitted and hence the degree of darkening for each element can be modulated by controlling the magnitude of the electric field above the threshold, thereby affording a grey scale.

In the above optical display device, operation is achieved by modulation of light transmission as illustrated in FIGURE 2. Alternatively, operation can be achieved by modulation of light reflection or absorption. In the absorptive mode of operation, as illustrated in FIGURE 3, one support plate, e.g. the back plate 11, can be coated with a layer of a dark material 23 so that light passing through the transparent plate 12 and the nematic liquid crystal layer 17 is absorbed at the darkened plate 11. Alternatively, the back plate can be made of an absorptive material. The light source 21a and viewer 22a are both on the same side as the transparent plate 12. When there is zero field applied between an electrode of the group 15a through 15d and an electrode of the group 16a through 16d, the surface of the device appears dark to the viewer as essentially all of the light is absorbed by the dark plate 11 and only a small quantity of light is reflected back to the viewer. When an electric field of sufficient magnitude is applied across any of said electrode pairs, for example electrodes 15a and 16d, the light at the intersection of these electrodes is caused to be reflected by the liquid crystal layer 17 and appears as a bright area to the viewer. In this mode of operation, the percent light reflected is modulated by the magnitude of the electric field. Also, the brighter the source light or ambient the brighter the reflected image. This mode is however the least efficient since most of the light is forward scattered into the dark absorbed and only a small percentage of the light is back scattered or reflected toward the viewer.

The preferred mode of operation, illustrated in FIGURE 4, is where one support plate, e.g. the back plate 11, is coated with a specular reflector rather than an absorber of light, for example, by a reflective material 24 on the outer face of the plate 11. In the reflective mode of operation, the light source 21b, which is on the same side as the viewer 22b, preferably produces a collimated beam at such an angle that the light reflected from the reflective coating 24 does not strike the viewer 22b. When an electric field is applied across the electrodes of the device as previously described, light will be scattered in the region of the electrode intersection causing some of the light to strike the viewer.

A variety of transparent solids may be utilized for a transparent support plate, including the various types of glass, fused quartz, transparent corundum and transparent plastics or resins. A non-transparent support plate may be made from the same materials as the transparent plate coated with a material such as a black organic dye. Alternatively, it can be made of materials such as a dark glass or dark plastic or epoxy resin.

The transparent conductive strips may be made, for example, by depositing thin layers of indium oxide or stannic oxide on the desired region of the plates 11 and 13. The conductive strips on the light-absorbing support plate need not be transparent and may, for example, be a film of copper, aluminum, chromium or nickel. It is also possible to use conductors running through the support plates, for example, wires embedded in the support plates or conductive plugs forming an integral part of the support plate. Alternatively, in some applications the field may be applied between parallel electrodes rather than crossed electrodes.

The spacing between the support plates may be maintained, for example, by means of shims, clamps, or a suitable frame-like holder.

In operation the device is maintained at a temperature at which the novel nematic-liquid crystal composition is in its mesomorphic state. If heating is required, this can be done by external heaters, for example, an infra-red heat lamp or heating coil in close proximity to the device. Alternatively, this can be accomplished by having transparent resistive layers on the outer faces of the support plates across which a voltage is applied so that the power dissipated in these layers heats the device.

Some devices which include novel mixtures as disclosed herein have a crystal-mesomorphic transition temperature slightly below room temperature and may be operated without heating the device. However, it is still preferable to heat these devices to temperatures of about 30–40° C. This is because when they are operated at or about the transition temperature the response time of the liquid crystal layer is slower than at higher temperatures in the mesophase; also the contrast ratio may be reduced due to a small amount of light scattering in the absence of a field.

The exact nature of this light-scattering effect is not known. It is theorized that the turbulence is due to electrohydrodynamic effects. It is believed that electrons are injected into the liquid crystal medium through the negative electrode. These electrons are then believed to immediately combine with neutral liquid crystal molecules to form negative ions therewith. These negative ions are then responsible for the current flow. The turbulence is then believed to be caused by either direct collisions of these mobile ions with neutral molecules which have substantially the same mass as the ions. In this way their momentum is transferred to the neutral molecules. Alternatively, turbulence may be produced by such electrohydrodynamic effects as non-uniform shear in regions of overlapping double layers or neutralizing charge clouds which are believed to surround the mobile ions.

A device using the light-scattering effects of the novel

Homogeneous mixtures included in the novel composition can be made over a wide variety of concentrations as the components tend to form homogeneous solid solutions over a wide range of concentrations. Mixtures can be prepared so that the melting point of the solid solution is less than the melting point of the individual solid liquid crystal compounds comprising the solid solution. The preferred composition for a mixture is one in which a eutectic is formed, the crystal-mesophase melting point being at a minimum for a eutectic mixture. The mole percent of compounds used in forming a eutectic depends on the particular compounds in the mixture.

Mixtures can be prepared, for example, by weighing the pure crystalline components in a beaker so as to get the desired proportions. The components are then heated with stirring above their mesomorphic-isotropic transition temperatures. The homogeneous liquid thus formed is allowed to cool to 0° C. The resulting solid is generally a waxy homogeneous mass.

In general, the compounds included in the novel composition can be prepared, for example, by the condensation of a p-acyloxy-phenylamine with the appropriate p-alkoxybenzaldehydes. The reaction is carried out in a refluxing benzene solution with benzenesulfonic acid or acetic acid as a catalyst and facility for azeotropic removal of water. The compounds can be purified by recrystallization from hexane solution. The recrystallization is repeated until a constant mesophase-isotropic transition temperature is reached, followed by one additional recrystallization during which the hexane solution is filtered through a micro-pore filter.

EXAMPLE I

A solution of 1.51 grams of p-aminophenylacetate, 1.78 grams of p-butoxybenzaldehyde and 0.1 gram of benzenesulfonic acid in 50 ml. of benzene is refluxed for about 3 hours. A Dean-Stark trap is used to collect the water which is azeotropically removed. After refluxing, the solvent is removed by evaporation under reduced pressure in a rotating film evaporator. The residue is collected and recrystallized three times from hexane. The yield is about 2 grams (64%) of colorless plates of

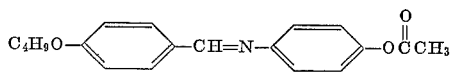

This product is then recrystallized once more, filtering the hot solution through a 0.2 micron filter prior to crystallization.

Analysis of the product shows 73.02% carbon, 6.77% hydrogen and 4.78% nitrogen. This can be compared to the theoretical calculated amounts based on the formula $C_{19}H_{21}NO_3$ which are 73.29% carbon, 6.80% hydrogen, and 4.50% nitrogen.

EXAMPLE II

A solution of 1.23 g. of p-anisidine, 1.78 g. of p-formylphenylpropionate and 0.10 g. of benzenesulfonic acid in 50 ml. of benzene is refluxed for about 4 hours. The same procedure as in Example I is used to isolate and purify the product. The theoretical calculated analysis for the product

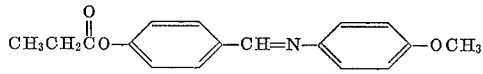

is 72.06% carbon, 6.05% hydrogen and 4.95% nitrogen. The amount found by experimentation was 72.71% carbon, 5.85% hydrogen, and 5.17% nitrogen.

EXAMPLE III

A solution of 5.4 g. of p-amino-phenol, 8.9 g. of p-butoxybenzaldehyde and 0.1 g. of benzenesulfonic acid in 200 ml. of benzene is refluxed for 4 hours. The same procedure as in Example I is used to isolate and purify the resulting yellow plates. Recrystallization of these plates from benzene results in white crystals of p-butoxybenzylidene-p-aminophenol. A mixture of 2.8 grams of this material in 10 ml. of a cold (−5° C. to 10° C.) 5 N sodium hydroxide solution and 100 ml. of benzene is then treated with 1.4 g. of propionic anhydride. This mixture is stirred for about 1 hour. The mixture is filtered with suction and its resulting two-phase filtrate is transferred to a separatory funnel.

The lower aqueous phase is removed and the benzene layer is washed twice with water. The benzene solution is then dried over anhydrous sodium sulfate. The benzene is then evaporated and the residue is recrystallized from hexane to yield colorless crystals of p-butoxybenzylidene-p-aminophenylpropionate.

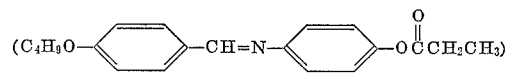

EXAMPLE IV

A solution of 54.5 g. of p-aminophenol, 68.0 g. of anisaldehyde and 0.1 g. of benzenesulfonic acid in 200 ml. of benzene is refluxed for four hours at which time about 9.0 ml. of water is collected in a Dean-Stark trap. The product is collected as in Example I and recrystallized from a 50:50 ethanol:benzene solution to give colorless crystals. A mixture of 2.1 g. of these crystals, 50 ml. pyridine and 1.9 g. of valeric anhydride is stirred at room temperature overnight. The solvent is then evaporated and the residue triturated with hexane to yield colorless crystals of p-methoxybenzylidine-p-aminophenylpentanoate

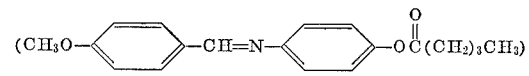

EXAMPLE V

A quantity of 100 mg. of p-(anisalamino)-phenylacetate and 100 mg. of p-butoxybenzylidene-p-aminophenylacetate are placed in a 5 ml. beaker. The beaker is heated on a hot plate to about 120° C. and the melt is stirred so as to form a homogeneous solution. The solution is then cooled to 0° C. and the homogeneous solid mass thus formed can then be stored at room temperature. In order to form an electro-optical device using this novel composition, a support plate having electrodes thereon such as back plate 11 of FIG. 1 is heated to about 60° C. and an amount of the purified novel composition is placed on the inner surface 13 of the support plate and allowed to flow over the surface. The inner surface 14 of the front plate 12 is then carefully placed over the fluid composition so that a continuous film essentially free of air bubbles is formed.

EXAMPLE VI

The same procedure as described in Example V is carried out using a mixture containing 50 mg. each of p-(anisalamino)phenylacetate, p - butoxybenzyliden e- p-aminophenylacetate, p - octoxybenzylidene - p - aminophenylacetate, and p - nonoxybenzylidene - p - aminophenylacetate.

What is claimed is:
1. An electro-optical device comprising
(1) a layer of a nematic liquid crystal composition consisting essentially of
(a) at least one compound represented by the formula

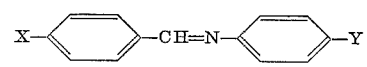

wherein X and Y are radicals chosen from the group consisting of a saturated alkoxy radical having from 1 to 9 carbon atoms and a saturated acyloxy radical having from 2 to 5 carbon atoms such that, when X is a saturated alkoxy radical, Y is a saturated acyloxy radical and vice versa, and when said saturated acyloxy radical has only 2 carbon atoms then said saturated alkoxy radical has at least 3 carbon atoms, (b) and from about 0 to 60 weight percent of p-(anisalamino)-phenylacetate, based on the total weight of said composition, (2) means for containing said layer when said composition is in its nematic liquid crystal state, (3) means for applying an electric field to said layer, said field being of sufficient magnitude to modulate the light-scattering properties of said layer, 2. The device described in claim 1 wherein said means for containing said layer is comprised of a front and a back transparent, insulative support plate, an inner major face of said front support plate being essentially parallel to and spaced less than ½ millimeter from an inner major face of said back support plate, said liquid crystal layer essentially filling said space between said support plates, and said electric field applying means includes a first plurality of parallel transparent conductive electrode strips disposed adjacent a major face of said front support plate, a second plurality of parallel transparent conductive electrode strips disposed adjacent a major face of said back support plate, said first plurality of conducting strips running in a direction substantially perpendicular to said second plurality of conducting strips for applying said electric field across said liquid crystal layer.

3. The device described in claim 1 wherein said means for containing said layer is comprised of a transparent insulative front support plate and an essentially light absorbing, insulative back support plate, an inner major face of said front support plate being essentially parallel to and spaced less than ½ millimeter from an inner major face of said back support plate, said liquid crystal layer essentially filling said space between said support plates, and said electric field applying means includes a first plurality of parallel transparent conductive electrode strips disposed adjacent a major face of said front support plate and a second plurality of conductive electrode strips disposed adjacent a major face of said back support plate, said first plurality of conducting strips running in a direction substantially perpendicular to said second plurality of conducting strips, and means including said first and second plurality of conducting strips for applying said electric field across said liquid crystal layer.

4. The device described in claim 1 wherein said means for containing said layer is comprised of a transparent insulative front support plate, and an insulative back support plate, said support plates having inner major surfaces parallel to and spaced less than ½ millimeter from each other, said back support plate includes a surface reflective to light passing through said front support plate, said liquid crystal layer essentially filling said space between said support plates, and said electric field applying means includes a first plurality of parallel transparent conductive electrode strips disposed adjacent a major surface of said front support plate and a second plurality of conductive electrode strips disposed adjacent a major face of said back support plate, said first plurality of conductive strips being substantially perpendicular to the direction of said second plurality of conductive strips, and means including said first and second plurality of conducting strips for applying said electric field across said liquid crystal layer.

5. The device described in claim 1 wherein said nematic liquid crystal composition includes at least two of said compounds, said compounds being present in such proportions as to form a mixture having a lower melting point than any of the individual compounds.

6. The device described in claim 5 wherein said compounds form a eutectic mixture.

7. The device described in claim 5 wherein said nematic liquid crystal composition consists essentially of from about 20 to 40 weight percent p-(anisalamino)- phenylacetate, from about 20 to 40 weight percent

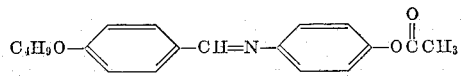

and from about 30 to 50 weight percent

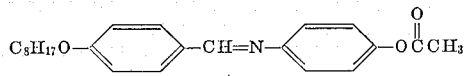

and wherein said means for containing said layer of said composition consists of essentially parallel support plates between which said composition is contained, at least one of said support plates being transparent and having a transparent conductive coating on at least one side thereof, and means including said transparent conductive coating for applying said electric field across said liquid crystal composition.

8. The device described in claim 5 wherein said nematic liquid crystal composition comprises compounds represented by the formulas

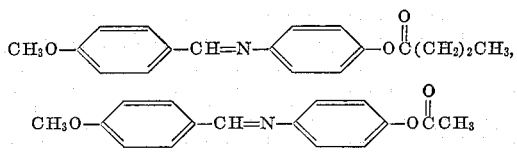

and at least one compound in the group consisting of

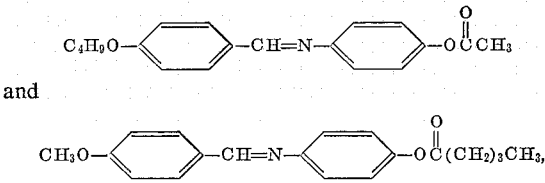

and wherein said means for containing said layer of said composition consists of essentially parallel support plates between which said composition is contained, at least one of said support plates being transparent and having a transparent conductive coating on at least one side thereof, and means including said transparent conductive coating for applying said electric field across said liquid crystal composition.

9. An electro-optical device comprising
(1) a layer of a nematic liquid crystal composition consisting essentially of
(a) at least one compound represented by the formula

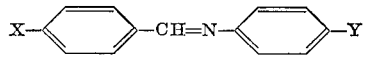

wherein X and Y are radicals chosen from the group consisting of a saturated alkoxy radical having from 1 to 9 carbon atoms and a saturated acyloxy radical having from 2 to 5 carbon atoms such that, when X is a saturated alkoxy radical, Y is a saturated acyloxy radical and vice versa, and when said saturated acyloxy radical has only 2 carbon atoms then said saturated alkoxy radical has at least 3 carbon atoms, (b) and from about 0 to 60 weight percent of p-(anisalamino)-phenylacetate, based on the total weight of said composition, (2) means for containing said layer when said composition is in its nematic liquid crystal state, (3) means for causing a current in said layer for affecting the light-scattering properties of said device.

References Cited

UNITED STATES PATENTS 3,322,485   5/1967   Williams _____ 350—160

OTHER REFERENCES

Dave, J. S., et al., J. Chem. Soc., 1954, 4616–21.

Vsol'tseva, V. A., et al., Russian Chem. Rev., 32 9, September 1963, 495–509.

RONALD L. WIBERT, Primary Examiner

P. K. GODWIN, JR., Assistant Examiner

U.S. Cl. X.R.

252—500; 260—479

UNITED STATES PATENT OFFICE
CERTIFICATE OF CORRECTION

Patent No. 3,540,796          Dated November 7, 1970

Inventor(s)   Joel E. Goldmacher et al

It is certified that error appears in the above-identified patent and that said Letters Patent are hereby corrected as shown below:

Col. 2 line 13   "deflected" should be --reflected--

Col. 2 line 72   "R-$\overset{O}{\overset{\|}{C}}$-O" should be -- R-$\overset{O}{\overset{\|}{C}}$-O— --

Col. 3 line 47   In the group appearing on the left-hand side of the structural formula, "$C_8H_7O-$" should be -- $C_8H_{17}O-$ --

Col. 3 line 50   before "crystals" insert -- liquid --

Col. 7 Table 1 Column Y   Compound Example 10 "—$O\overset{O}{\overset{\|}{C}}(CH_2)_2CH_3$" should be -- —$O\overset{O}{\overset{\|}{C}}(CH_2)_3CH_3$ --

SIGNED AND
SEALED
MAR 9 1971

(SEAL)
Attest:

Edward M. Fletcher, Jr.
Attesting Officer

WILLIAM E. SCHUYLER, JR.
Commissioner of Patents